United States Patent [19]

Olsen et al.

[11] 4,117,942
[45] Oct. 3, 1978

[54] MEANS FOR ADJUSTING THE SIDEBOARD

[75] Inventors: James A. Olsen, Fresno; Gene R. Butler, Kingsburg, both of Calif.; George L. Sesser, Walla Walla, Wash.

[73] Assignee: Sperry Rand Corporation, New Holland, Pa.

[21] Appl. No.: 847,977

[22] Filed: Nov. 2, 1977

Related U.S. Application Data

[63] Continuation of Ser. No. 717,413, Aug. 24, 1976.

[51] Int. Cl.² .............................................. B65G 59/08
[52] U.S. Cl. ........................................ 214/6 B; 52/67; 296/26
[58] Field of Search ...................... 214/6 B; 296/26, 7; 52/67, 72

[56] References Cited

U.S. PATENT DOCUMENTS

| 3,137,041 | 6/1964 | Mullen | 52/67 |
| 3,245,714 | 4/1966 | Blair | 296/26 |
| 3,447,826 | 6/1969 | Gostamski | 296/26 |
| 3,804,267 | 4/1974 | Cook et al. | 214/6 B |

FOREIGN PATENT DOCUMENTS

| 1,293,652 | 4/1962 | France | 296/26 |
| 2,337,942 | 2/1975 | Fed. Rep. of Germany | 296/26 |

OTHER PUBLICATIONS

Operators Manual for Stackcruiser S-1049, p. 32, Sperry New Holland 1974.

Primary Examiner—Albert J. Makay
Assistant Examiner—Ross Weaver
Attorney, Agent, or Firm—John B. Mitchell; Frank A. Seemar; Ralph D'Alessandro

[57] ABSTRACT

A bale wagon has improved actuating means for adjustably moving sideboard structures supported along opposite sides of a load bed on the bale wagon in order to change the spacing between the structures so that formation of stacks having different widths may be accommodated on the load bed. Each of the sideboard structures is supported by an upstanding member. The improved means includes an elongated tube extending along and rotatably mounted to each upstanding member and a set of upper and lower linkages associated with each elongated tube, the linkages respectively interconnecting upper and lower portions of the elongated tube with respective adjacent end portions of upper and lower means which support upper and lower portions of the respective upstanding member for movement toward and away from the load bed side. Furthermore, each set of the linkages are retractible and extensible upon respective rotation and counter-rotation of the elongated tube. Therefore, by selectively rotating and counter-rotating the elongated tube, the linkages may be retracted and extended and thereby cause selected movement of the respective one of the upstanding member and the one of the sideboard structures supported thereby toward and away from the corresponding load bed side.

10 Claims, 6 Drawing Figures

MEANS FOR ADJUSTING THE SIDEBOARD

This is a continuation of application Ser. No. 717,413, filed Aug. 24, 1976.

BACKGROUND OF THE INVENTION

1. FIELD OF THE INVENTION

The present invention relates generally to the art of forming a stack of crop material bales and, more particularly, is concerned with means on a bale wagon for providing improved adjustability of sideboard structures along the sides of a load bed of the bale wagon in order that formation of stacks having different widths may be accommodated on the load bed.

2. DESCRIPTION OF THE PRIOR ART

It is accepted present day practice to form bales of crop material such as hay or the like into stacks through the employment of an automatic bale wagon.

One type of bale wagon which has achieved widespread commercial acceptance is the automatic bale wagon which employs the three table concept, as originally illustrated and described in U.S. Pat. No. 2,848,127 to G. E. Grey.

The Grey bale wagon includes a transversely-mounted first table normally disposed in a generally horizontal position in which it successively receives bales from a bale loader or pickup positioned on the wagon adjacent one end of the first table and accumulates a predetermined number of bales at a time, ordinarily two or three, being arranged end-to-end in a row, a second table normally disposed in a generally horizontal position rearwardly of and above the first table in which it successively receives the row of bales from the first table when the latter is pivoted upwardly and rearwardly approximately 90° and accumulates the rows of bales until a full tier of bales has been formed thereon, and a third table or load bed normally disposed in a generally horizontal position rearwardly of and above the second table in which it successively receives the tiers of bales from the second table when the latter is pivoted upwardly and rearwardly approximately 90° and accumulates the tiers standing vertically on the load bed until a full stack of bales has been formed thereon. Once the stack has been accumulated on the load bed, it may be unloaded by pivoting the load bed upwardly and rearwardly approximately 90° and depositing the stack on the ground or the like with the bales as previously accumulated into the tiers thereof on the second table of the wagon now forming the horizontal layers of bales in the stack now standing on the ground.

To a significant degree, the efficient stack forming operation of the Grey bale wagon and specifically the quality of the stack formed thereby in terms of its ability to stand over long periods of time and to be retrieved depends upon providing adequate front, rear and side stabilization for the vertical tiers of the stack while standing on the load bed.

The rear end of the stack on the load bed is supported by a fore-and-aft movable rolling rack which contacts the rear end of the rearmost one of the vertically standing tiers of the stack. The opposite sides of the stack are respectively supported by sideboard structures which extend along respective opposite sides of the load bed and contact respective opposite sides of the stack. The front end of the stack is stabilized against tipping forwardly by a tine arch assembly which is located above and engages the top horizontal row of bales in the forwardmost one of the tiers of the stack.

The sideboard structures are mounted so that each may be moved toward and away from its respective side of the load bed to change the spacing between the structures in order that the formation of stacks having different widths may be accommodated on the load bed. Heretofore, the adjustable mounting assembly for the sideboard structures has included an upstanding wing member disposed adjacent the forward end of the load bed at each opposite side thereof. The sideboard structures are respectively mounted at their forward ends to the respective wing members. Each of the wing members have inwardly extending tubular bars at its upper and lower ends which are telescopibly received within respective opposite ends of a corresponding upper transverse support tube which also mounts the aforementioned tine arch assembly and a corresponding lower transverse support tube mounted on the frame of the bale wagon below the front end of the load bed.

In order to fix the spacing between the sideboard structures at a given dimension, set screws are utilized to secure each of the respective tubular bars of the wing members at a desired telescoped position within its corresponding one of the ends of the upper and lower support tubes. Accordingly, to adjust or change the spacing between the sideboard structures, the set screws must first be loosened and then the wing members moved either toward or away from the load bed sides depending upon the desired dimension of the new spacing. Once the sideboard structures have been adjusted to the new spacing, the set screws are re-tightened.

While the lower end of each wing member may be adjusted by the operator standing on the ground, first, at one side of the load bed and, next, at the opposite side thereof, adjustment of the upper end of each wing member may only be carried out by the operator climbing up to each of the opposite ends of the upper support tube. This requirement has proven to be very inconvenient and time-consuming for the operator. Furthermore, there is no way that the operator alone can adjust the upper and lower ends of one wing member simultaneously. Therefore, the operator has to move the upper and lower ends individually which frequently causes binding within the telescoping slidable connections between the wing member and the upper and lower support tubes.

SUMMARY OF THE INVENTION

The present invention substantially overcomes the above-described problems associated with the prior art adjustable mounting assembly by providing an improved adjustment means which allows simultaneous or concurrent movement of the upper and lower ends of the wing member either toward or away from the adjacent load bed side. Such simultaneous adjustment may be carried out by the operator while standing on the ground adjacent to the respective wing member. Also, no clamping or retaining devices, such as set screws, are needed to secure the respective upper tubular bars of the wing members to their corresponding ends of the upper support tube. Further, a mechanical advantage is provided by the particular design of the improved adjustment means which minimizes the amount of effort that needs to be expended by the operator to overcome the frictional forces between the telescoping parts.

Accordingly, the improved adjustment means of the present invention is provided on a bale wagon having a load bed being adapted to receive successive tiers of bales at one end thereof and accumulate the tiers to form a stack thereon and means for stabilizing the stack on the load bed. The stabilizing means includes sideboard structure extending along each of the opposite sides of the load bed for laterally supporting the stack, upstanding members supporting the respective sideboard structures, lower means supporting the upstanding members adjacent the lower ends thereof and mounting at least one of the upstanding members for transverse movement toward and away from the load bed, and upper means extending between and supporting the upper ends of the upstanding members with the upper supporting means mounting at least the one of the upstanding members for transverse movement toward and away from the load bed.

The improved adjustment means is operable for selectively moving at least the one of the upstanding members and thereby the sideboard structure supported thereon toward and away from the corresponding load bed side to change the spacing between the sideboard structures in order that the formation of stacks having different widths may be accommodated on the load bed. The adjustment means comprises actuating means interconnecting upper and lower portions of the one upstanding member with respective adjacent end portions of the upper and lower supporting means, the actuating means being operable for concurrently moving the upper and lower portions of the one upstanding member toward and away from the adjacent end portions of the upper and lower supporting means and thereby toward and away from the adjacent side of the load bed, and means for selectively operating the actuating means.

More particularly, the actuating means includes an elongated member extending along and rotatably mounted to at least the one upstanding member, upper linkage means interconnecting an upper portion of the elongated member and the adjacent end portion of the upper supporting means and lower linkage means interconnecting a lower portion of the elongated member and the adjacent end portion of the lower supporting means. The upper linkage means is retractible and extensible toward and away from the adjacent end portion of the upper supporting means, while the lower linkage means is retractible and extensible toward and away from the adjacent end portion of the lower supporting means, upon respective rotation and counter-rotation of the elongated member. Further, the means for selectively operating the actuating means includes means for selectively rotating and counter-rotating the elongated member. The latter means includes a socket element fixed to the lower portion of the elongated member and a handle member removably insertable into the socket element.

Still further, the upper linkage means includes a first link element fixed to the upper portion of the rotatable elongated member and extending outwardly therefrom and a second link element pivotally interconnecting an outer end of the first link element and the adjacent end portion of the upper supporting means. The lower linkage means includes a third link element fixed to the lower portion of the rotatable elongated member and extending outwardly therefrom and a fourth link element pivotally interconnecting an outer end of the third link element and the adjacent end portion of the lower supporting means.

Other advantages and attainments of the improvement provided by the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which.

DETAILED DESCRIPTION OF THE INVENTION

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

IN GENERAL

Figure 1:
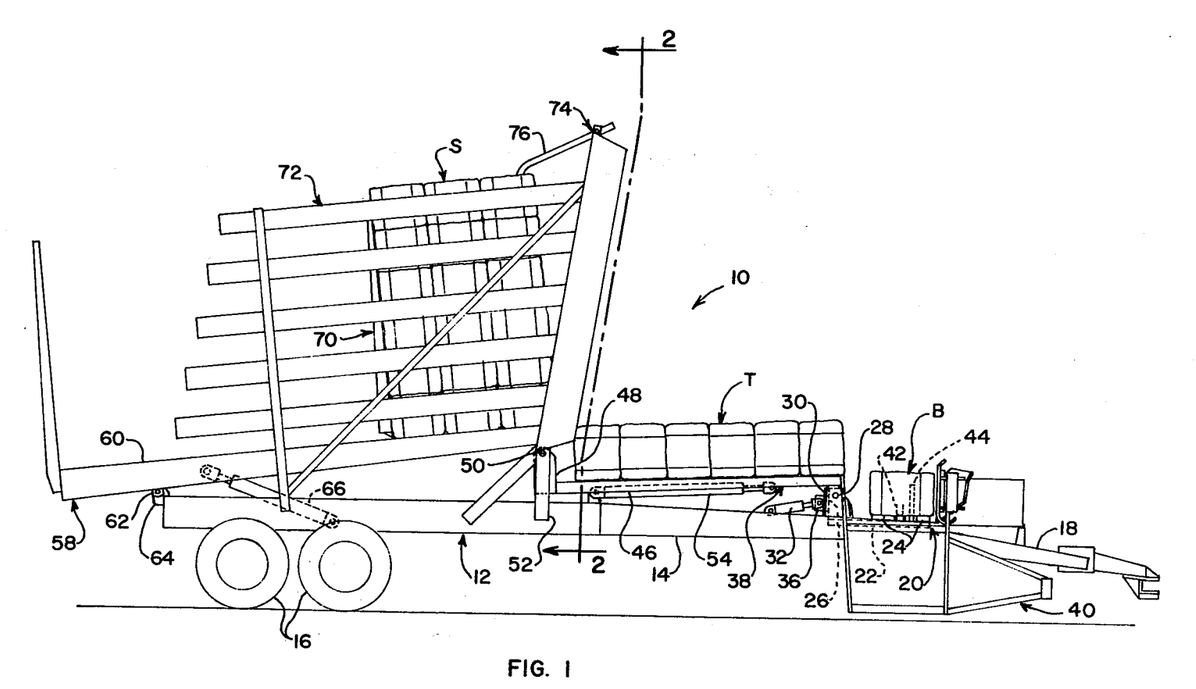
FIG. 1 is a side elevational view of a bale wagon incorporating the adjustment means which comprises the improvement provided by the present invention.

Referring now to the drawings, and particularly to FIG. 1, there is shown a bale wagon, being indicated generally by the numeral 10, for forming a stack of bales and incorporating the preferred embodiment of the improvement provided by the present invention.

The bale wagon 10 is provided with a mobile chassis, indicated generally as 12, formed of right and left longitudinally extending channels 14 (see FIG. 2), suitably interconnected by spaced transverse channels (not shown), and right and left pairs of tandemly-arranged wheels 16 (only the right rear wheel being shown) for movably supporting the interconnected longitudinal channels 14. The forward ends of the channels 14 converge in a clevis assembly 18 which adapts the wagon 10 to be secured to a tractor, or other towing vehicle, located at the front of the wagon 10. Although the wagon illustrated is a pull-type wagon, it could readily take the form of a self-propelled type.

Mounted near the forward end of the mobile chassis 12, immediately rearwardly of the clevis assembly 18 and extending transversely thereto, is means for receiving bales, generally indicated by the numeral 20 and hereinafter referred to as a first, bale-receiving table of the wagon 10. The first table 20 is formed by an L-shaped structure having a forwardly-extending horizontal portion 22 on which is mounted two transversely extending spaced beams 24. The L-shaped structure also has a rear upwardly extending leg portion 26 which is pivotally secured at 28 between spaced-apart upstanding right and left front brackets 30 (only the right bracket being shown) respectively mounted on the longitudinal channels 14. A hydraulic cylinder 32 is pivotally secured at its anchor end to a bracket (not shown) member mounted on the chassis 12. The rod end of the hydraulic cylinder 32 is pivotally secured to the free end of an arm 36 which is fixedly secured to, and extends rearwardly from, the L-shaped structure of the first table 20. As the hydraulic cylinder 32 is extended, the first table 20 will swing or pivot approximately 90° upwardly about its pivot point 28 transferring any bales B which have been received on the first table 20 onto the forward end of a second, tier-forming table, being generally indicated by numeral 38.

It will be understood by those skilled in the art, that bales are first introduced to the first table 20 by means of a bale loader or pickup, generally indicated at 40, which is mounted to the chassis 12 at the right end of the first table 20 and operative to lift bales from the ground and direct them through a generally 90° arcuate lateral path to the right receiving end of the first table 20. The loader 40, well known in the art, is generally similar to the one illustrated and described in U.S. Pat. No. 2,848,127 and need not be illustrated and described in detail herein for a thorough and clear understanding of the present invention.

Also, it will be understood by those skilled in the art, that a cross conveyor 42 is operatively mounted to the chassis 12 and longitudinally extends between, along, and slightly above the level of, the two spaced beams 24 of the first table 20 (when the table is in its lower horizontal position) from approximately the right receiving end to near the middle of the beams 24 for advancing the bales laterally from the loader 40 toward the left end of the first table 20. The cross conveyor 42, also well known in the art, is generally similar to the one illustrated and described in U.S. Pat. No. 2,848,127 and need not be illustrated and described in detail herein for a thorough and clear understanding of the present invention.

The first table 20 is capable of receiving a predetermined number of bales, preferably three bales, successively at a given time from the bale loader 40. After receiving the three bales in end-to-end arrangement from the loader 40, an outer bale trip arm or lever 44 located at the left end of the first table 20 is engaged and pivoted laterally outward by the leading end of the first of the three bales being advanced toward the left end of the first table 20 by the cross conveyor 42. Such pivoting of trip arm 44 causes actuation of the hydraulic cylinder 32 through suitable trip mechanism and hydraulic components coupled thereto and thereby extension and retraction of the hydraulic cylinder 32 which, in turn, causes pivotal movement of the first table 20 from a lower, bale-receiving position (FIG. 1) to an upper, bale-discharge position adjacent the second table 38 and back to the lower position. The trip mechanism and hydraulic components which intercouple the trip arm 44 to the hydraulic cylinder 32 are well known in the art and need not be illustrated and described in detail herein for a thorough and clear understanding of the present invention. Thus, the first table 20 will successively receive and transfer three bales arranged end-to-end in a row to the second table 38 until a full tier has been formed thereon.

The second, tier-forming table 38 is formed by an L-shaped structure having a forwardly extending leg portion 46 across which is defined a surface upon which bales are accumulated and formed into a tier and an upwardly extending rear leg portion 48 which is pivotally secured at 50 between spaced apart upstanding brackets 52, only the right one being shown in FIG. 1, mounted on the longitudinal channels 14. A hydraulic cylinder 54 is pivotally secured at its anchor end to the chassis 12 and its rod end is pivotally secured to the underside of the leg portion 46 of the L-shaped structure of the second table 38.

When the second table 38 is in its normal horizontal tier-forming position, as shown in FIG. 1, it rests at its forward end on a transverse support member fixed across the upstanding right and left front brackets 30. When the requisite number of rows of bales have been accumulated and formed on the second table 38 into a tier T, the hydraulic cylinder 54 is actuated so as to extend and cause the table 38 to swing or pivot upwardly generally 90° about its pivot point 50 to a generally vertical position adjacent the front end of the rearwardly disposed tier-accumulating means hereinafter referred to as the load bed, or third load table, being generally indicated by the numeral 58. In this manner, the tier of bales formed on the second table 38 is transferred to a vertically standing position on front end of the load bed 58.

It will be understood by those skilled in the art, that trip means (not shown) is located near the rear end of the second table 38 which is engaged by the rearmost bales in the tier when the tier is completely formed and causes actuation of the hydraulic cylinder 54 and thereby pivotal movement of the second table 38. The structure and function of the second table trip means are well known in the art and need not be illustrated and described herein for a thorough and clear understanding of the present invention.

The load-carrying bed 58 includes a platform assembly 60 which is pivotally mounted at 62 between spaced apart upstanding rear brackets 64, only the right one being shown in FIG. 1, mounted on the longitudinal channels 14. A pair of spaced apart hydraulic cylinders 66, only the right one being shown, are pivotally secured at their anchor ends to the chassis 12 and at their rod ends to the platform assembly 60. When the load bed 58 is in its normal, generally horizontal tier-receiving position, as shown in FIG. 1, it rests at its forward end on a transverse member 68 (FIG. 2) which extends between upstanding brackets 52. A stack of bales S is progressively formed on the load bed 58 upon successive delivery thereto of tiers of bales by pivotal movement of the second table 38 from its normal horizontal tier-forming position of FIG. 1 to its generally upright position adjacent the forward end of the load bed 58.

As the first bale tier is delivered or deposited onto the load bed 58, a fore-and-aft movable rolling rack, being generally indicated by the numeral 70, is contacted by the tier and forced to move rearwardly along the load bed 58. It will be understood by those skilled in the art, that while the rolling rack 70 is spring biased to move toward the forward end of the load bed 58, the bias of the spring means is overcome with the delivery of each successive bale tier from the second table 38 to the front end of the load bed 58 whereby the rolling rack 70 is forced to move rearwardly one bale width until the rack 70 reaches a rearmost position along the load bed 58, whereupon a complete stack has been formed on the load bed 58. The structure and function of the rolling rack 70, well known in the art, is generally similar to that illustrated and described in U.S. Pat. No. 2,848,127 and need not be illustrated and described in detail herein for a thorough and clear understanding of the present invention.

When the load bed 58 has been fully loaded, the stack can be transferred to the ground in the form of a composite stack by extension of the hydraulic cylinders 66 which causes the load bed 58 to pivot generally 90° about point 62 from its generally horizontal position of FIG. 1 to an upright position in which the rolling rack 70 and the rear end of the load bed 58 are disposed adjacent the ground.

STACK STABILIZATION ON THE LOAD BED OF THE BALE WAGON

As explained above, the ability of the stack formed on the bale wagon 10 stand over long periods of time when placed on the ground depends greatly upon providing adequate front, rear and side stabilization for the vertical tiers of the stack while standing on the load bed 58 of the bale wagon 10.

The system on the bale wagon 10 for stabilizing the vertical tiers of the stack standing thereon basically includes the rolling rack 70, a pair of right and left sideboard structures 72 (only the right one being shown in FIG. 1) and a tine arch assembly 74. The rear end of the stack on the load bed 58 is supported by the rolling rack 70 which contacts the rear end of the rearmost one of the vertically standing tiers of the stack. The opposite sides of the stack are respectively supported by the sideboard structures 72 which extend along respective opposite sides of the load bed and contact respective opposite sides of the stack. The front end of the stack is stabilized or constrained against tipping forwardly by the tine arch assembly 74 which is located above the forwardmost one of the tiers of the stack and includes a plurality of transversely spaced, downwardly and rearwardly declining tines 76 which engage the top horizontal row of bales in the forwardmost tier.

Figure 3:
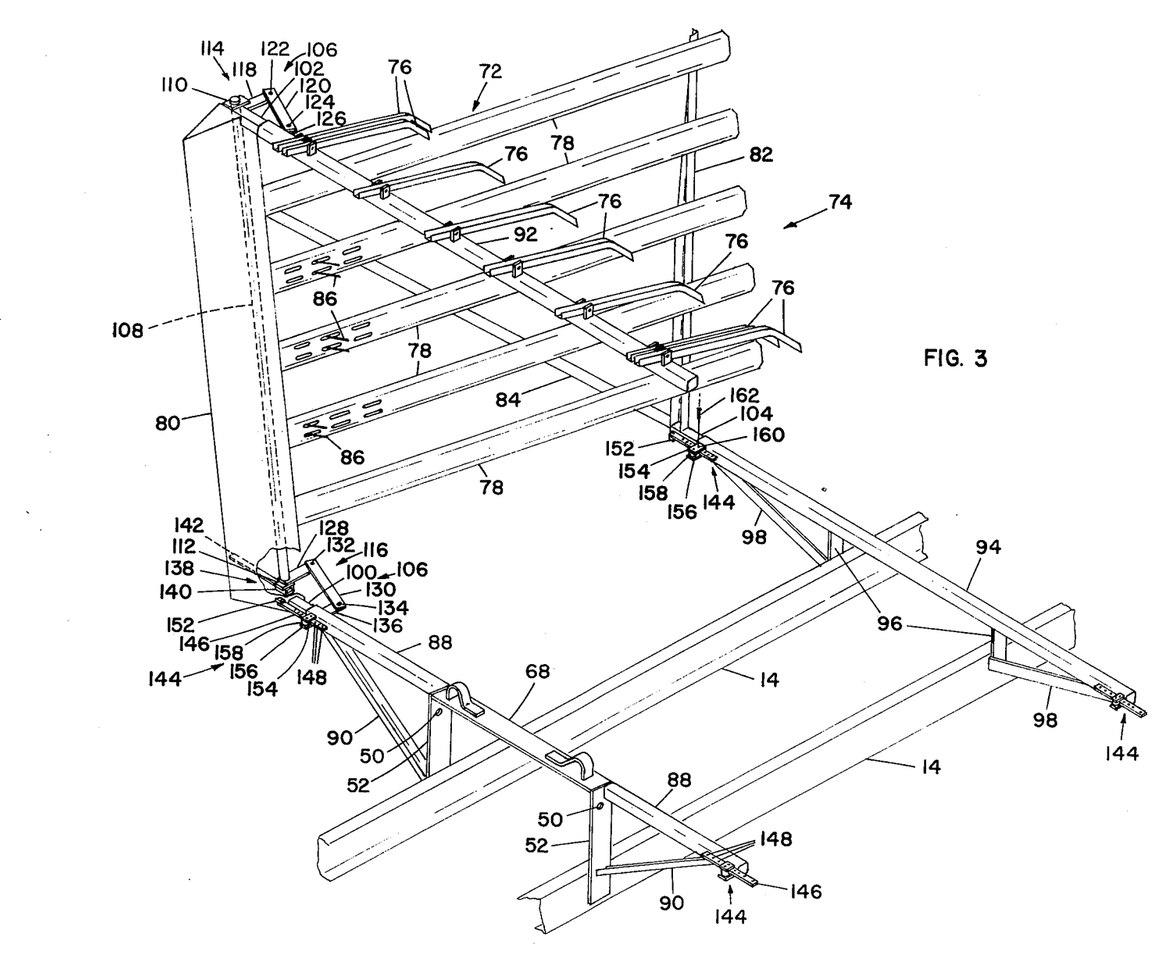
FIG. 3 is a perspective view of the mounting assembly, the right sideboard structure and the tine arch assembly, also illustrating the improved adjustment means operatively associated therewith.

As seen in FIG. 3, each of the sideboard structures 72 (only the right one being shown) is comprised by a series of side-by-side rails 78 being disposed in a vertical plane as a unit and extending fore-and-aft along a respective side of the load bed 58 by a front upstanding wing member 80 and a rear upright strut member 82 to which the rails 78 are respectively attached at their forward ends and near their rear ends. A brace 84 diagonally extends between and interconnects the two members 80,82 and also is attached to the outside surface of each of the rails 78. Each of the upstanding wing members 80 is generally triangular shaped in cross-section with the respective inner sides of the members 80 facing toward each other and tapering inwardly and rearwardly to effectuate forcing of any laterally dislocated bales of a tier, being delivered to the front end of the load bed 58, toward the longitudinal centerline of the bale wagon 10. Also, a vertical row of spring tines 86 is provided on each of the sideboard structures 72, each tine 86 being yieldably mounted on a front portion of one of the rails 78 and extending inwardly and rearwardly therefrom. The tines 86 will engage the side of the forwardmost vertical tier of bales standing on the front end of the load bed 58 and assist in preventing forward tipping of the tier. However, the tines 86 will yieldably move outwardly toward the respective rail 78 to allow movement of the tier rearwardly along the load bed 58 due to engagement by a next successive tier being delivered to the front end of the load bed 58.

MEANS FOR MOUNTING SIDEBOARD STRUCTURES AND TINE ARCH ASSEMBLY

Figure 2:
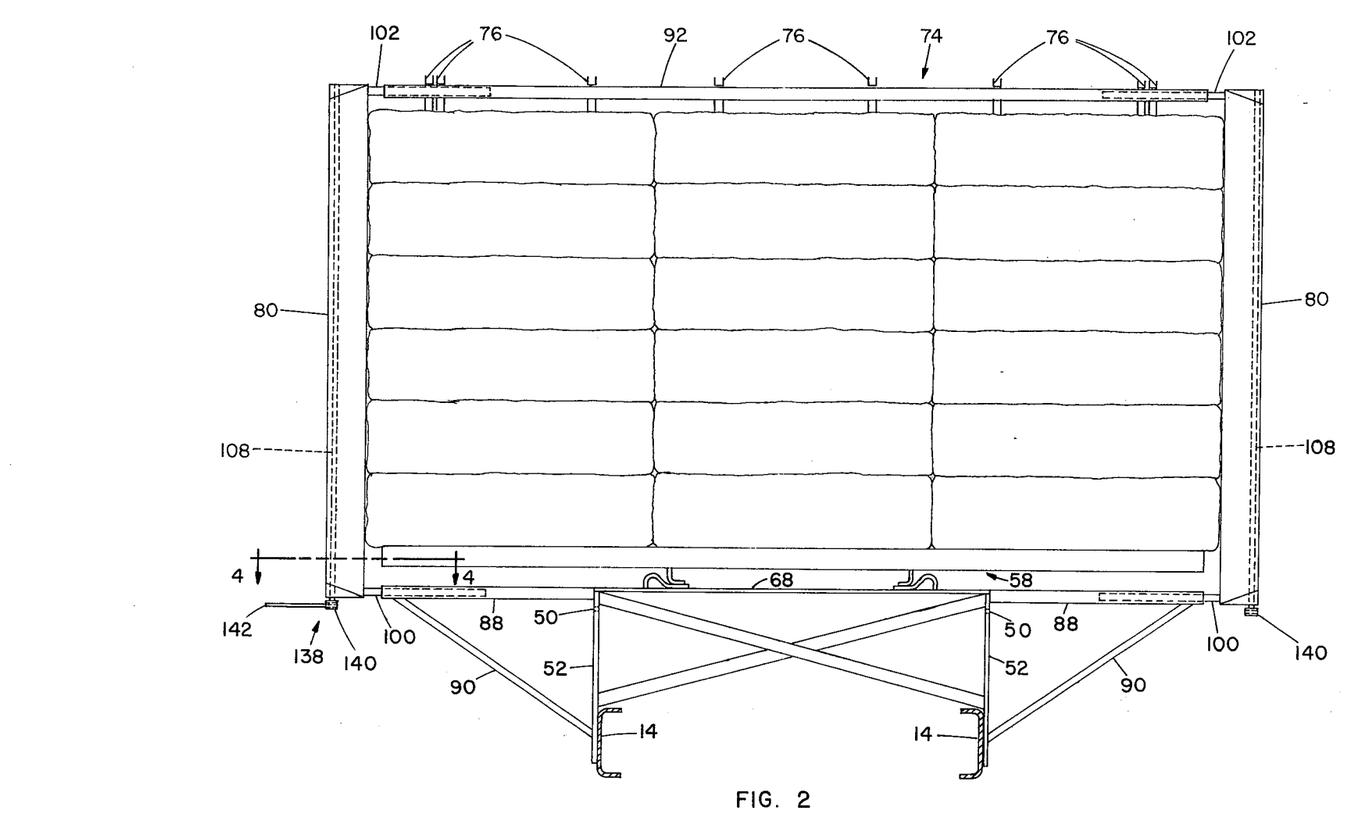
FIG. 2 is a front elevational view taken along line 2—2 of FIG. 1, but on a somewhat larger scale than that of FIG. 1, showing the mounting assembly for the sideboard structures and tine arch assembly located at the forward end of the load bed of the bale wagon.

In FIGS. 2 and 3, there is shown the preferred form of the means for mounting each of the sideboard structures 72 as well as the tine arch assembly 74. Only the right one of the sideboard structures 72, as well as only the right ones of members 80,82 and brace 84, are illustrated in FIG. 3 for sake of clarity, it being understood that the left structure 72, members 80,82 and brace 84 are constructed and assembled along the left side of the load bed 58 in an arrangement which constitutes a mirror image of the right ones thereof.

For supporting the sideboard structures 72 along respective opposite sides of the load bed 58, lower front and rear tubular means and front upper tubular means are provided. The front lower means takes the form of a short support tube 88 which extends laterally outwardly from the side of each of the second table mounting brackets 52. Each of the front lower support tubes 88 is square in cross-section and reinforced by a diagonal brace 90. The front upper means takes the form of an elongated support tube 92 being square in cross-section and extending between the upper ends of the wing members 80. The front upper support tube 92 pivotally mounts the tines 76 of the tine arch assembly 74 at laterally spaced apart locations therealong. The rear lower means takes the form of an elongated transverse support tube 94 being square in cross-section and mounted on the channels 14 by vertical brackets 96 and reinforced by diagonal braces 98.

The upstanding wing members 80 have inwardly projecting tubular bars 100,102 respectively mounted at lower and upper ends thereof which are square in cross-section and of a size adapted to be telescopibly and slidably received within the respective outer ends of the front lower short support tubes 88 and front upper support tube 92. The rear strut members 82 have inwardly projecting tubular bars 104 at their respective lower ends being square in cross-section and of a size adapted to be telescopibly and slidably received within the outer ends of the lower rear support tube 96.

Therefore, in the preferred embodiment of the mounting means, it is seen that, in order to change the spacing between the sideboard structures 72, either one or both of the wing members 80 and of the strut members 82 are moved either toward or away from the adjacent respective side or sides of the load bed 58 depending on the desired new spacing intended for the sideboard structures 72.

IMPROVED MEANS FOR ADJUSTING THE SIDEBOARD STRUCTURES

Also in FIG. 3, there is illustrated improved actuating means, being generally designated by numeral 106, for adjustably moving upper and lower portions of the right upstanding wing member 80 simultaneously and thereby the right sideboard structure 72 toward and away from the right side of the load bed 58. The same actuating means 106 (FIG. 2) is also operatively associated with the left upstanding wing member 80, being in an arrangement which constitutes a mirror image of actuating means 106 as associated with the right wing member 80. For the sake of brevity, therefore, only the actuating means 106 associated with the right wing member 80, as illustrated in FIG. 3, will be described, it being understood that the same description applies equally to the actuating means 106 associated with the left wing member 80, a portion of which is seen in FIG. 2.

The actuating means 106 includes an elongated rigid tube 108 which extends along the rear side of the right upstanding wing member 80 and is rotatably mounted thereto by upper and lower tabs 110,112 which are attached to and project rearwardly from the upper and lower end portions of the member 80. Also, the actuating means 106 includes upper linkage 114 and lower linkage 116. The upper linkage 114 interconnects an upper end portion of the elongated tube 108 and an adjacent end portion of the front upper support tube 92. The lower linkage 116 interconnects a lower end portion of the elongated tube 108 and an adjacent end portion of the right front lower support tube 88. Upon respective clockwise and counterclockwise rotation of the elongated tube 108, the upper and lower linkages 114,116 concurrently retract and extend toward and away from the respective adjacent end portions of the front upper support tube 92 and right front lower support tube 88. Such respective concurrent retraction and extension of the upper and lower linkages 114,116 correspondingly moves the elongated tube 108, and therewith the right upstanding wing member 80 and its attached right sideboard structure 72, toward and away from the right side of the load bed 58.

The upper linkage 114 is comprised by a first link element 118 which is fixed to the upper end portion of the elongated tube 108 adjacent its upper mounting tab 110 and extends outwardly from the tube 108 and a second link element 120 which at its outer end at 122 is pivotally connected to the outer end of the first link element 118 and at its inner end at 124 is pivotally interconnected to the adjacent end portion of the front upper support tube 92 via a tab 126 being fixed to the latter. The lower linkage 116 is comprised by a third link element 128 which is fixed to the lower end portion of the elongated tube 108 adjacent its lower mounting tab 112 and extends outwardly from the tube 108 and a fourth link element 130 which at its outer end at 132 is pivotally connected to the outer end of the third link element 128 and at its inner end at 134 is pivotally interconnected to the adjacent end portion of the right front lower support tube 88 via a tab 136 being fixed to the latter.

In FIG. 3, there is also illustrated manual means, being indicated generally by numeral 138, for selectively operating the above-described actuating means 106. As in the case of the actuating means 106, the manual means 138 associated with left upstanding wing member 80 is the same as that associated with the right member 80. However, for the sake of brevity, only the manual means 138 associated with the right wing member 80, as illustrated in FIG. 3, will be described, it being understood that the same description applies equally to the manual means 138 associated with the left wing member 80, as seen in FIG. 2. The manual means 138 is comprised by a socket element 140 which is fixedly attached to the lower end of the elongated tube 108 and a handle element 142 which may be inserted into the socket element 140 when it is desired to selectively rotate the tube 108 either clockwise or counterclockwise for adjusting the right sideboard structure 72 toward or away from the right side of the load bed 58. During periods of non-use, the handle element 142 is adapted to be removed from the socket element 140 and stored in some appropriate place on the bale wagon 10 or the tractor.

Again, in FIG. 3, there is further illustrated retainer means, being indicated generally by numeral 144, for maintaining the right sideboard structure 72 at a desired adjusted position relative to the right side of the load bed 58. As in the case of the actuating means 106 and manual means 138, the retainer means 144 associated with the left upstanding wing member 80 is the same as that associated with the right member 80. However, for the sake of brevity, only the retainer means 144 associated with the right wing member 80, as illustrated in FIG. 3, will be described, it being understood that the same description applies equally to the retainer means 144 associated with the left wing member 80, also partly seen in FIG. 3. The retainer means 144 includes a slider bar 146 having holes 148 defined vertically through the bar 146 at evenly spaced locations along the longitudinal extent of the bar 146. The bar 146 at its outer end at 150 is secured to a tab 152 which is fixed to the inner surface of the right upstanding wing member 80 at the lower end thereof adjacent to the lower tubular bar 100. The bar 146 extends inwardly therefrom and between spaced upper and lower tabs 154,156 which are fixed to and project forwardly from the adjacent end portion of the right front lower support tube 88. A bushing 158 is mounted between the outer ends of the tabs 154,156 and the bar 146 extends between the bushing 158 and the end portion of the right front lower support tube 88. Vertically-extending and aligned holes 160 (only the upper hole being shown) formed in the upper and lower tabs 154,156 will receive a retaining pin 162 therethrough and also through one of the holes 148 in the slider bar 146 aligned with holes 160 of the tabs 154,156 after the right sideboard structure 72 has been laterally adjusted to its desired position. The pin 162 is first removed whenever readjustment is to take place.

Figure 4:
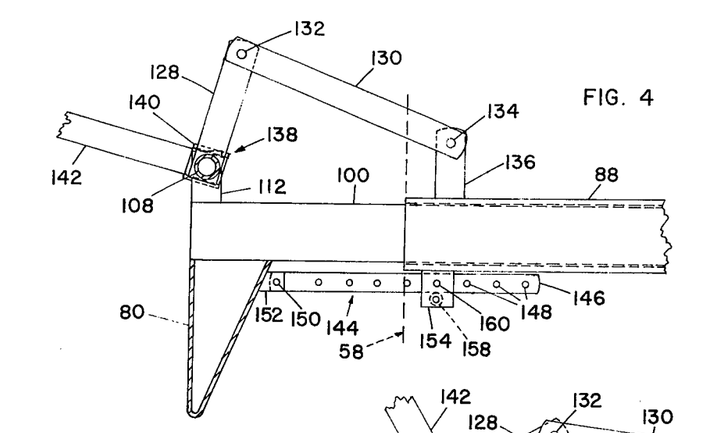
FIG. 4 is an enlarged, fragmentary top plan view taken along line 4—4 of FIG. 2, showing the lower linkage of the improved adjustment means at an intermediate position.
Figure 5:
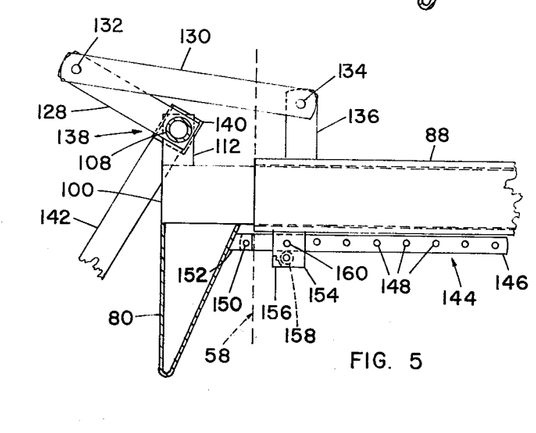
FIG. 5 is a view similar to that of FIG. 4, but showing the linkage at a fully retracted position.
Figure 6:
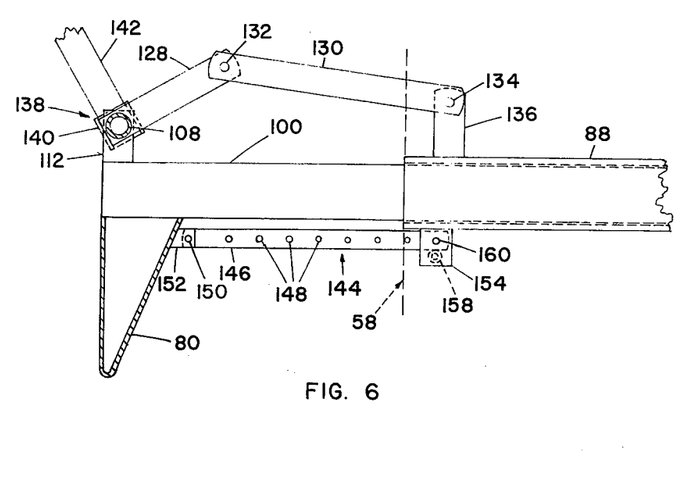
FIG. 6 is a view similar to that of FIG. 4, but showing the linkage at a fully extended position.

FIGS. 4 through 6 respectively illustrate intermediate, retracted and extended positions of the lower linkage 116 associated with the lower portion of the right upstanding wing member 80. It should be understood that the upper linkage 114 associated with the upper portion of the right wing member 80 concurrently assumes positions identical to those illustrated for the lower linkage 116. Also, it should be understood that the upper and lower linkages 114,116 associated with the left upstanding wing member 80 are concurrently movable between intermediate, retracted and extended positions wherein their arrangements constitute mirror images of the respective arrangements illustrated in FIGS. 4 through 6.

In the intermediate position, the third link element 128 extends in a fore-and-aft direction rearwardly from the elongated tube 108 to which the third element 128 is attached, while the fourth link element 130 extends generally diagonally between its mounting tab 136 and the outer end of the third link element 128. When the end of the handle element 142 has been inserted into the socket element 140, as shown in FIG. 4, counterclockwise rotation of the handle element 142 rotates the tube 108 in the same direction and moves the linkage 116 to its retracted position of FIG. 5 wherein the third link element 128 is at an outwardly extending transverse position and the fourth link element 130 is at a transverse position adjacent said upstanding member 80, while clockwise rotation of the handle element 142 rotates the tube 108 in the same direction and moves the linkage 116 to its extended position of FIG. 6 wherein the third link element 128 is at an inwardly extending transverse position and the fourth link element 130 is at generally the same transverse position as before. Of course, the rotation of the handle element 142 may be terminated at any desired angular position so as to dispose the linkage at any desired position between its fully retracted and extended positions. It is seen that retraction of the linkage 116 moves the tube 108 and the right upstanding member 80 (and right sideboard structure 72 attached thereto) toward the right side of the load bed 58, while extension of the linkage 116 moves the tube 108 and member 80 away from the right side of the load bed 58. Therefore, the spacing between the right and left sideboard structure 72 is decreased upon retraction of the linkage 116 (and the linkage 114 which moves concurrently therewith) and increased upon extension of the linkage 116 (and the linkage 114 therewith). The aforementioned retainer means 144 may be utilized to maintain the respective sideboard structures 72 at their desired adjusted positions.

It is thought that the improved adjustment means of the present invention and many of its attendant advantages will be understood from the foregoing description and it will be apparent that various changes may be made in the form, construction and arrangement of its parts without departing from the spirit and scope of the invention or sacrificing all of its material advantages, the form hereinbefore described being merely a preferred or exemplary embodiment thereof.

Having thus described the invention, what is claimed is:

1. In a bale wagon having a load bed being adapted to receive successive tiers of bales at one end thereof and accumulate said tiers to form a stack thereon and means for stabilizing said stack on said load bed, said stabilizing means including sideboard structure extending along each of the opposite sides of said load bed for laterally supporting said stack, upstanding members supporting said respective sideboard structures, lower means supporting said upstanding members adjacent the lower ends thereof and mounting at least one of said upstanding members for transverse movement toward and away from said load bed and upper means extending between and supporting the upper ends of said upstanding members, said upper supporting means mounting at least said one of said upstanding members for transverse movement toward and away from said load bed, improved adjustment means for selectively moving at least said one of said upstanding members and thereby said sideboard structure supported thereon toward and away from said corresponding load bed side to change the spacing between said sideboard structures in order that the formation of stacks having different widths may be accommodated on said load bed, said improved adjustment means comprising:

actuating means interconnecting upper and lower portions of said one upstanding member with respective adjacent end portions of said upper and lower supporting means, said actuating means being operable for concurrently moving said upper and lower portions of said one upstanding member toward and away from said adjacent end portions of said upper and lower supporting means and thereby toward and away from said respective adjacent side of said load bed; and means for selectively operating said actuating means.

2. A bale wagon as recited in claim 1, wherein said actuating means includes an elongated member extending along and rotatably mounted to said one upstanding member such that said upper and lower portions of said one upstanding member are concurrently moved toward and away from said load bed upon respective rotation and counter-rotation of said elongated member.

3. A bale wagon as recited in claim 2, wherein said means for selectively operating said actuating means includes:

a socket element fixed to a lower portion of said elongated member; and a handle member insertable into said socket member for selectively rotating and counter-rotating said elongated member.

4. In a bale wagon having a load bed being adapted to receive successive tiers of bales at one end thereof and accumulate said tiers to form a stack thereon and means for stabilizing said stack on said load bed, said stabilizing means including sideboard structure extending along each of the opposite sides of said load bed for laterally supporting said stack, upstanding members supporting said respective sideboard structures, lower means supporting said upstanding members adjacent the lower ends thereof and mounting at least one of said upstanding members for transverse movement toward and away from said load bed and upper means extending between and supporting the upper ends of said upstanding members, said upper supporting means mounting at least said one of said upstanding members for transverse movement toward and away from said load bed, improved adjustment means for selectively moving at least said one of said upstanding members and thereby said sideboard structure supported thereon toward and away from said corresponding load bed side to change the spacing between said sideboard structures in order that the formation of stacks having different widths may be accommodated on said load bed, said improved adjustment means comprising:

actuating means interconnecting upper and lower portions of said one upstanding member with respective adjacent end portions of said upper and lower supporting means, said actuating means being retractible and extensible toward and away from said end portions of said upper and lower supporting means for moving said one upstanding member toward and away from said load bed; and means for selectively retracting and extending said actuating means.

5. In a bale wagon having a load bed being adapted to receive successive tiers of bales at one end thereof and accumulate said tiers to form a stack thereon and means for stabilizing said stack on said load bed, said stabilizing means including sideboard structure extending along each of the opposite sides of said load bed for laterally supporting said stack, upstanding members supporting said respective sideboard structures, lower means supporting said upstanding members adjacent the lower ends thereof and mounting at least one of said upstanding members for transverse movement toward and away from said load bed and upper means extending between and supporting the upper ends of said upstanding members, said upper means mounting at least said one of said upstanding members for transverse movement toward and away from said load bed, improved adjustment means for selectively moving at least said one of said upstanding members and thereby said sideboard structure supported thereon toward and away from said corresponding load bed side to change the spacing between said sideboard structures in order that formation of stacks having different widths may be accommodated on said load bed, said improved adjustment means comprising:

an elongated member extending along and rotatably mounted to said at least one upstanding member;

upper linkage means interconnecting an upper portion of said elongated member and an adjacent end portion of said upper supporting means, said upper linkage means being retractible and extensible toward and away from said end portion of said upper supporting means upon respective rotation and counter-rotation of said elongated member;

lower linkage means interconnecting a lower portion of said elongated member and an adjacent end portion of said lower supporting means, said lower linkage means being retractible and extensible toward and away from said end portion of said lower supporting means upon respective rotation and counter-rotation of said elongated member; and means for selectively rotating and counter-rotating said elongated member whereby said upper and lower linkage means may be correspondingly retracted and extended and thereby cause selected movement of said upstanding member and said one of said sideboard structures supported thereby toward and away from said corresponding load bed side.

6. A bale wagon as recited in claim 5, wherein said means for selectively rotating and counter-rotating said elongated member includes:

a socket element fixed to said lower portion of said elongated member; and a handle member removably insertable into said socket element.

7. A bale wagon as recited in claim 5, wherein:

said upper linkage means includes a first link element fixed to said upper portion of said elongated member and extending outwardly therefrom and a second link element pivotally interconnecting an outer end of said first link element and said adjacent end portion of said upper supporting means; and said lower linkage means includes a third link element fixed to said lower portion of said elongated member and extending outwardly therefrom and a fourth link element pivotally interconnecting an outer end of said third link element and said adjacent end portion of said lower supporting means.

8. A bale wagon as recited in claim 7, wherein said selected rotation of said elongated member, which results in concurrent retraction of said upper and lower linkage means, causes each of said first and third link elements of the latter to be concurrently moved toward an outwardly extending transverse position through a fore-and-aft extending position away from an inwardly extending transverse position to a predetermined location therebetween said transverse positions which causes concurrent movement of each of said second and fourth link elements away from a transverse position adjacent said upstanding member to a generally diagonal extending position and back toward said transverse position to a predetermined location therebetween said diagonal and transverse positions.

9. A bale wagon as recited in claim 8, wherein said selective counter-rotation of said elongated member, which results in concurrent extension of said upper and lower linkage means, causes each of said first and third link elements of the latter to be concurrently moved away from said outwardly extending transverse position through said fore-and-aft extending position toward said inwardly extending transverse position to a predetermined location therebetween said transverse positions which causes concurrent movement of each of said second and fourth link elements away from said transverse position to said generally diagonal extending position and back toward said transverse position to a predetermined location therebetween said diagonal and transverse positions.

10. In a bale wagon having a load bed being adapted to receive successive tiers of bales at one end thereof and accumulate said tiers to form a stack thereon and means for stabilizing said stack on said load bed, said stabilizing means including sideboard structure extending along each of the opposite sides of said load bed for laterally supporting said stack, upstanding members supporting said respective sideboard structures, lower means supporting said upstanding members adjacent the lower ends thereof and mounting the same for transverse movement toward and away from said load bed and upper means extending between and supporting the upper ends of said upstanding members, said upper supporting means mounting the same for transverse movement toward and away from said load bed, improved adjustment means for selectively moving said upstanding members and thereby said respective sideboard structures supported thereon toward and away from said respective load bed sides to change the spacing between said sideboard structures in order that the formation of stacks having different widths may be accommodated on said load bed, said improved adjustment means comprising:

first actuating means interconnecting upper and lower portions of one of said upstanding members with respective adjacent one end portions of said upper and lower supporting means, said first actuating means being retractible and extensible toward and away from said one end portions of said upper and lower supporting means for moving said one upstanding member toward and away from said load bed;

second actuating means interconnecting upper and lower portions of the other of said upstanding members with respective adjacent other end portions of said upper and lower supporting means, said second actuating means being retractible and extensible toward and away from said other end portions of said upper and lower supporting means for moving said other upstanding member toward and away from said load bed; and means for selectively retracting and extending each of said first and second actuating means.

* * * * *